United States Patent [19]
Chwastyk

[11] 3,783,258
[45] Jan. 1, 1974

[54] FFT PROCESSOR UTILIZING VARIABLE LENGTH SHIFT REGISTERS

[75] Inventor: Adolph M. Chwastyk, Silver Spring, Md.

[73] Assignee: The United States of America as represented by the Secretary of the Navy, Washington, D.C.

[22] Filed: Nov. 3, 1971

[21] Appl. No.: 195,394

[52] U.S. Cl. .............................. 235/156, 324/77 G
[51] Int. Cl. .............................. G06f 15/34
[58] Field of Search .................... 235/152, 181, 156; 324/77 B, 77 G, 77; 328/167

[56] References Cited

UNITED STATES PATENTS

| | | | |
|---|---|---|---|
| 3,673,399 | 6/1972 | Hancke | 235/156 |
| 3,573,446 | 4/1971 | Bergland | 235/156 |
| 3,446,949 | 5/1969 | Trimble | 235/152 |
| 3,617,720 | 11/1971 | Gentleman | 235/156 |

OTHER PUBLICATIONS

P. D. Welch, "The Use of FFT for the Estimation of Power Spectra: A Method Based on Time Averaging Over Short, Modified Periodograms", IEEE Trans. on Audio & Electroacoustics, Vol. AU–15 No. 2. June, 1967, pp. 70–73.

C. Bingham, "Modern Techniques of Power Spectrum Estimation," IEEE Trans. on Audio & Electroacoustics June, 1967, pp. 56–66.

*Primary Examiner*—Malcolm A. Morrison
*Assistant Examiner*—David H. Malzahn
*Attorney*—R. S. Sciascia et al.

[57] ABSTRACT

A processor for radar and multichannel sonar spectral analysis of band-limited input signals, is based on a shift register implementation of a fast Fourier transform algorithm coupled with a single flow-through arithmetic unit. Speed is obtained by using an organization that performs the rapid data reordering required for execution of the algorithm. A post-processing unit is used to increase the quality of estimation of line spectra in statistically short term spectra. The unit can be used either as an integrator or as a first order recursive filter. The post-processing unit is implemented in a floating point format to maintain the dynamic range.

2 Claims, 7 Drawing Figures

INVENTOR.
ADOLPH M. CHWASTYK
BY
ATTORNEY

INVENTOR.
ADOLPH M. CHWASTYK

INVENTOR.
ADOLPH M. CHWASTYK

INVENTOR.
ADOLPH M. CHWASTYK

INVENTOR.
ADOLPH M. CHWASTYK

INVENTOR.
ADOLPH M. CHWASTYK

FFT PROCESSOR UTILIZING VARIABLE LENGTH SHIFT REGISTERS

BACKGROUND OF THE INVENTION

The invention relates to a device for performing data processing and reorganization by implementing a fast Fourier transform algorithm. More specifically, this invention relates to a processor that performs the fast Fourier transform by utilizing the Cooley-Tukey algorithm.

The fast Fourier transform is a computational tool which facilitates signal analysis such as power spectrum analysis and filter simulation by means of digital computers. It is a method for efficiently computing the discrete Fourier transform of a series of dats samples referred to as a time series. Spectral analysis using the fast Fourier transform algorithm has proven to be important in both sonar and radar data processing. However, the core memory orientated implementations of the algorithm have provided an inherent hinderance, i.e., a limitation in their speed of operation. Prior art devices will handle a relatively large number of data points but at a correspondingly long computational time. If less computation time is desired, then a corresponding drop in the number of data points must be accepted. However, the subject invention can handle a large volume of data points in less time than has been possible heretofore. More specifically, the present invention is able to reduce computational time by a factor of 10.

SUMMARY OF THE INVENTION

The fast Fourier transform (FFT) is a method for efficiently computing the discrete Fourier transform (DFT) of a time series (discrete data samples). The efficiency of this method is such that solutions to many problems can now be obtained substantially more economically than in the past.

If digital analysis techniques are to be used for analyzing a continuous waveform, then it is necessary that the data be sampled (usually at equally spaced intervals of time) in order to produce a time series of discrete samples which can be fed into a digital computer. As is well known, such a time series completely represents the continuous waveform, provided this waveform is frequency band-limited and the samples are taken at a rate that is at least twice the highest frequency present in the waveform. When these samples are equally spaced they are known as Nyquist samples. It will be shown that the DFT of such a time series is closely related to the Fourier transform of the continuous waveform from which samples have been taken to form the time series. This makes the DFT particularly useful for power spectrum analysis and filter simulation on digital computers.

Thus, the fast Fourier transform (FFT) is a highly efficient procedure for computing the DFT of a time series. It takes advantage of the fact that the calculation of the coefficients of the DFT can be carried out iteratively, which results in a considerable savings of computation time.

The Digital Fourier Analyzer (DFA) of the present invention was designed for on-line, multi-channel sonar and radar spectral analysis. In its basic mode, it can digitize band-limited complex analog data, obtain the power spectra from the Fourier coefficients, and display filtered power spectra. Its alternate and more flexible usage is as a computer peripheral. The inputs to the analyzer can be either analog or digital.

The Cooley-Tukey algorithm has been used as a basis for the present invention. Speed is obtained by using shift registers in an organization that allows rapid reordering of the data as required in executing the algorithm, and further by using a single pipeline arithmetic unit capable of obtaining vector products at the shift register clock rate. The Fast Fourier Transform (FFT) unit can transform 4,096 complex points into Fourier coefficients in 10 ms, which qualifies it as one of the fastest units known.

A post-processing unit is incorporated in the processor to increase quality of estimation of line spectra in statistically random short term spectra. The unit can be used either as an integrator or as a first order digital filter. It is implemented in a floating point word format to maintain dynamic range with a resonable word length. Hardware is kept to a minimum by establishing minimum and maximum ratios of the input and filter loop words.

It is an object of this invention, therefore, to provide a Digital Fourier Analyzer that can be used for radar and multi-channel sonar spectral analysis of band-limited input signals.

It is another object of this invention to provide a Digital Fourier Analyzer that can transform complex data points into Fourier coefficients with a minimum amount of time.

Another object of this invention is to provide a Digital Fourier Analyzer that can obtain the power spectra from Fourier coefficients.

It is a further object of this invention to provide a Digital Fourier Analyzer that has means to increase the quality of estimation of line spectra in statistically random short term spectra.

It is still another object of this invention to provide a Digital Fourier Analyzer that can utilize the Cooley-Tukey algorithm in the computation of Fourier coefficients.

Another object of the invention is to provide a Digital Fourier Analyzer that efficiently utilizes shift registers in the execution and reordering of data as required in the computation of the algorithm.

A further object of the invention is to provide a Digital Fourier Analyzer that keeps hardware to a minimum by establishing minimum and maximum ratios of the input and recursive filter loop words.

And still another object of the invention is to provide a Digital Fourier Analyzer that can transform a large number of complex points into Fourier coefficients in an extremely short time.

Further objects and many of the attendant advantages of this invention will be readily appreciated as the same becomes better understood by reference to the following detailed description when considered in connection with the accompanying drawings.

BRIEF DESCRIPTION OF THE PREFERRED EMBODIMENT

Figure 1:
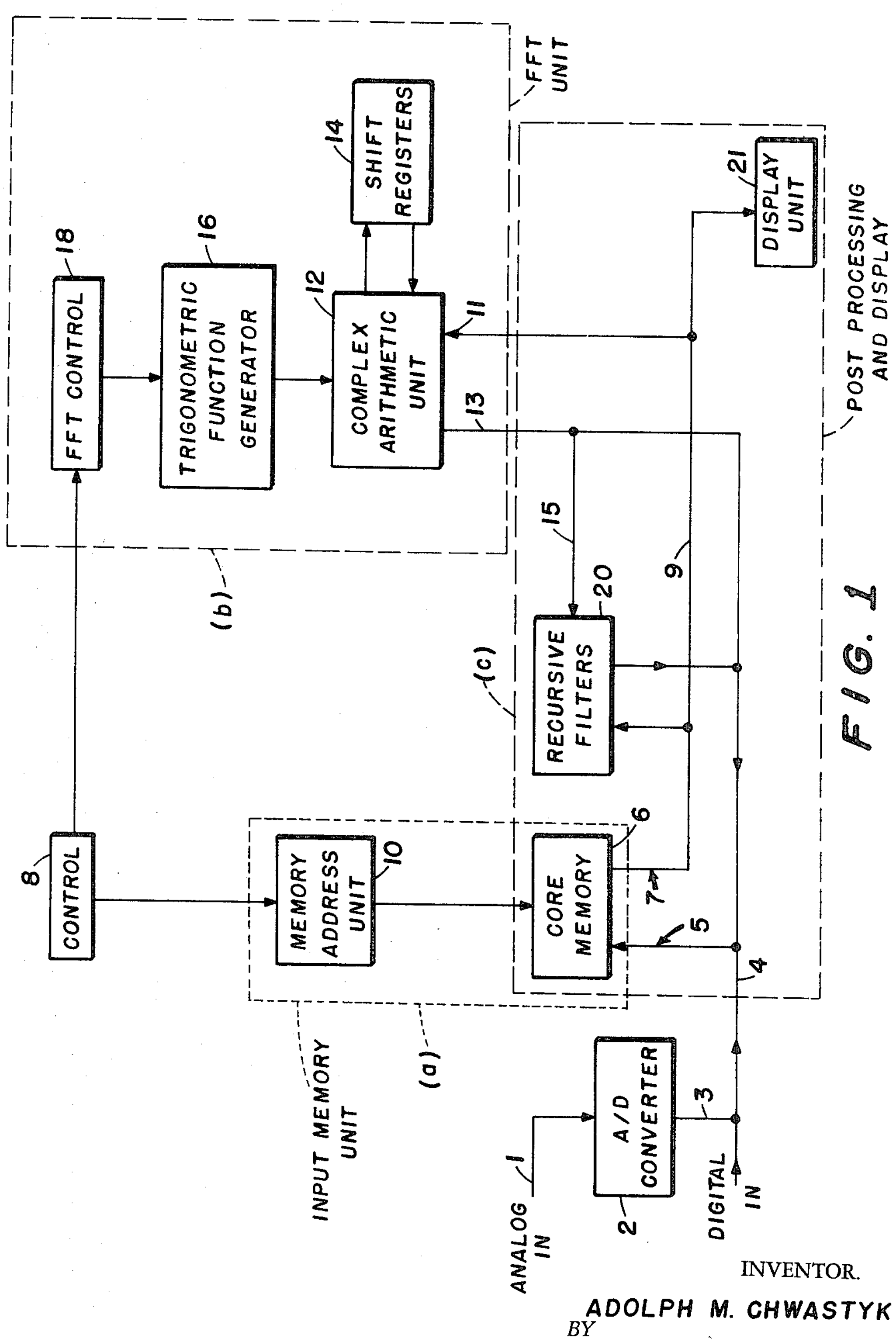
FIG. 1 is a general block diagram of the Digital Fourier Analyzer.

The block diagram of the DFA system is shown in FIG. 1. This organization can be broken into three basic areas: (a) an input memory for large scale multiplexing of input data channels, (b) a shift register Fast Fourier Transform (FFT) unit, and (c) a post-processing and display unit.

Incoming raw analog data 1 is first applied to an A/D converter 2 whose digital output 3 is applied to a memory input bus 4. The output digital data 3 is applied to a core memory 6 which is controlled by a control unit 8 and a memory address unit 10. The 12, core memory is utilized at this point in the operation as a large scale multiplexer of the input data. As will be explained hereinafter, the bit core memory 6 is also used for post-processing. Multiplexed digital data output on a conductor 7, emergent from the core memory 6, is fed at input 11 into a complex arithmetic unit 12 of the FFT unit via an output bus 9. The complex arithmetic unit 12 along with a shift register unit 14 performs a Fourier transform on the incoming data set, requiring multiple passes of the data through the arithmetic unit 22, with data modification on each pass. A trigonometric function generator 16, as controlled by a FFT control unit 18, provides sine and cosine waveform generation necessary for the algorithm computation. One additional pass of the data through the complex arithmetic unit 12 is required to obtain power from the Fourier coefficients. The post-processing is accomplished by routing output 13 of the complex arithmetic unit 12 to a recursive filter unit 20 via a data path 15. Simultaneously, previously stored filter data is read from core memory via data path 7. After circuit delays, the updated filter data is stored back into the core memory 6 via a path defined by a conductor 5. The operation of the FFT unit and post-processing unit will be explained in greater detail hereinafter.

The FFT shift register memory 14 has storage capabilities for 4,096 complex data points. These can be either a single set of 4,096 points, or a number of sets from M different input channels, provided the number of points per set (N) is reduced so that NM = 4,096. The input memory extends the number of data points the system is capable of handling. The post-processing unit also requires memory storage if any kind of long term averaging is required for spectral estimation and data reduction purposes. As stated above, for reasons of economy, both the input multiplexing memory (a) and the post-processing unit (c) share the single core memory unit 6. As presently programmed, the core memory 6 can store up to 8,192 input samples and 8,192 post-computation processing filter positions. The normal operating procedure is to load raw data into the memory core 6 via conductor 5, process it in the FFT unit (b) via input 11 of the complex arithmetic unit 12, perform the algorithm and power computation in the FFT unit (b), and update the post-processing recursive filters stored in core memory via recursive filter electronics 20. Then the processed data is returned to the core memory unit prior to display in a display unit 21.

Figure 2:
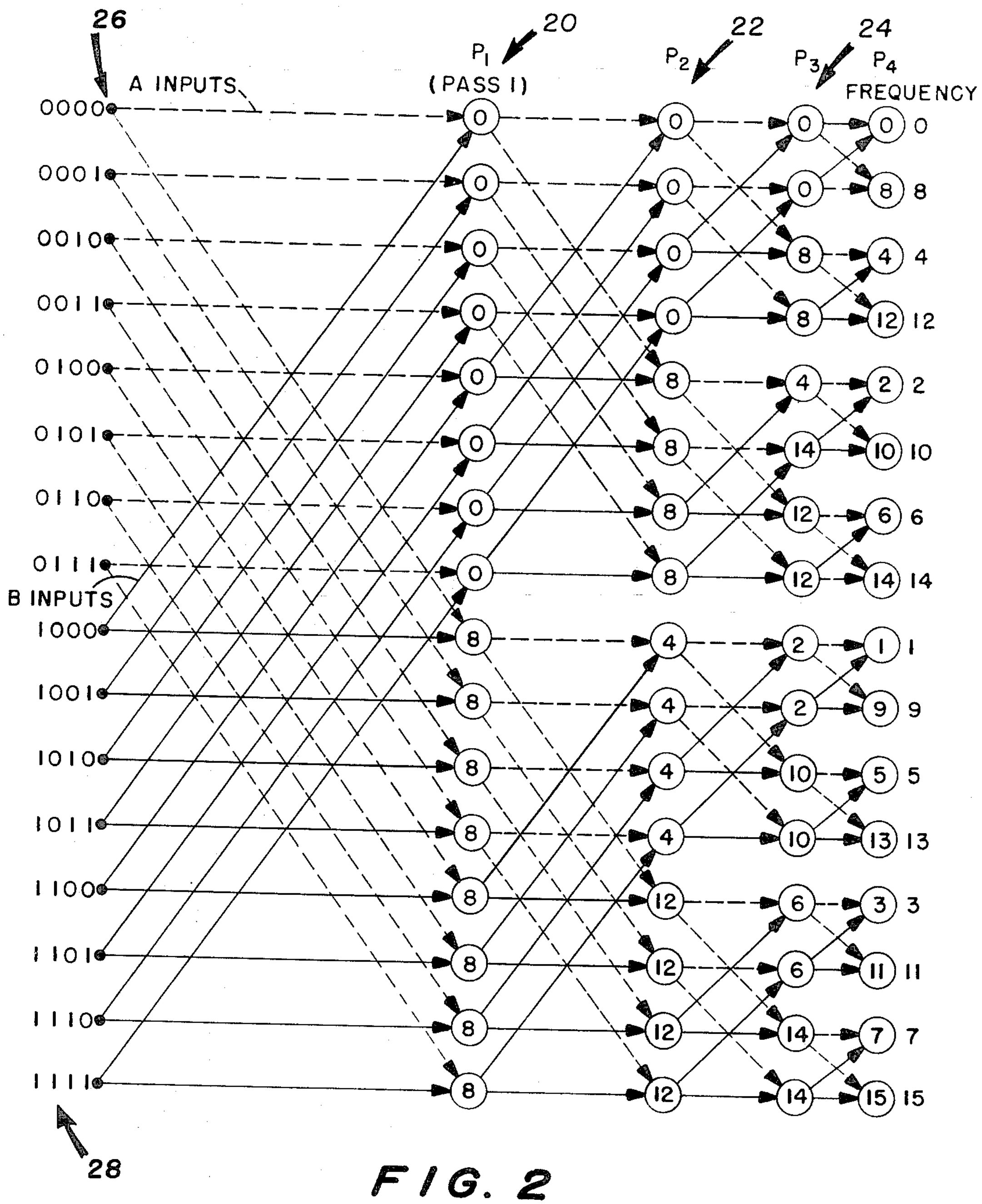
FIG. 2 is a flow graph for naturally ordered time samples.

The basic FFT algorithm used for solving discrete Fourier transforms is well covered in the literature, e.g., (1) IEEE Transactions on Audio and Electroacoustics, Special Issue on Fast Fourier Transform, Vol. AU-17, No. 2, June 1969; (2) IEEE Transactions on Audio and Electroacoustics, Special Issue on Fast Fourier Transform, Vol. AU-15, No. 2, June 1967; (3) R.B. Blackman and J.W. Tukey, *The Measurement of Power* Spectra, Dover Publication, New York, 1958; (4) F.E. Nathanson, *Radar Design Principles*, McGraw-Hill, New York, 1969; (5) B. Gold and C.M. Rader, *Digital Processing of Signals*, McGraw-Hill, New York, 1969. The FFT algorithm essentially utilizes a series of two point transform computations where the foldover ambiguities are reduced at each stage until the full sampling frequency is reached. In other words, the set of time samples is transformed into the frequency domain by a series of computations, each requiring only two data points of the original data set of from partially processed data sets. A flow graph for naturally ordered time samples is shown in FIG. 2. The flow graph consists of nodes shown in columns 20, 22 and 24 and directed branches preceding and following each node. Each node represents a variable which is the weighted sum of the variables of all the branch nodes on the left that terminate on that node. The mechanics of its general usage will aid in understanding the FFT as it is implemented. In the flow graph, the left hand row of small dots, shown generally at 26, corresponds to the input data points with index numbers 0 through 15 for the N = 16 array. The index numbers are printed in digital format and shown generally at 28. In a random access system, this would correspond to a memory address. The nodes of the remaining columns 20, 22 and 24 represent an operation of $A + B \exp(-j2\pi Z/N)$, where the A inputs can be determined by following the dotted line to the left of the node 20, and the B inputs by following the solid line. The Z factor is the rotational value listed in the nodes of the flow graph. A pass is defined as a completion of all operations in a column, resulting in a set of N intermediate data points. The intermediate answers obtained are indexed 0 through 15 to correspond to the input data set.

To minimize computations memory operations in implementing the flow graph, it is desirable to rotate the B inputs only once per two-point transform. This is done by:

$$A' = A + B \exp(-j2\pi Z/N)$$

$$B' = A - B \exp(-j2\pi Z/N),$$

where $Z$ is now modulo N/2, and the additional 180° rotation is supplied by the negative sign.

Figure 3:
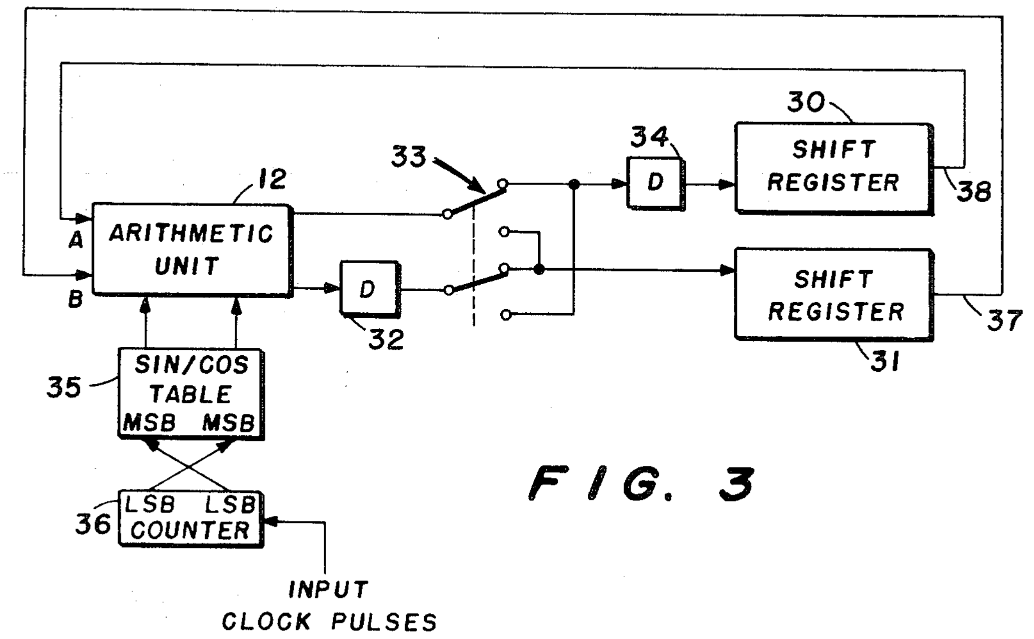
FIG. 3 is a block diagram of the Digital Fourier Analyzer reiterative fast Fourier transform unit.

The 16-point transform is used to establish flow and control patterns in the DFA reiterative FFT unit (b), as shown in FIG. 3. Data is initially stored respectively in shift registers 30 and 31. The first pass, based on data points separated by 8 (or, for the general case, N/2) is obtained by shifting both shift register 30 and shift register 31. As output pairs of words are obtained, the data stream at the register 31 output 37 is delayed by 4 (or N/4P for the general case where P is the data pass number) in a delay device 32. This delay makes it possible, by a switch 33, to switch between the register 30 and the delayed register 31 outputs so that data words leaving the switch 33 are staggered in time but in proper order for the next pass. The switch position is changed every 4 (or N/4P) clock pulses. The data entering shift register 30 is delayed by 4 (or N/4P) clock pulses by a delay device 34 to eliminate the staggering without stopping the shift register clock. This allows use of dynamic MOS (metal oxide semiconductor) shift registers, and simplifies system timing. Successive passes through the intermediate data points follow the same format until the single delay last pass has been completed. This is shown by pass 4 in FIG. 2 which is labelled P4. If the output data is used at the processing rate, new data may enter the system during the last pass. Thus, minimum time between data sets becomes $0.5\ Nt_c \log_2 (N+1)$, where $t_c$ is the clock period.

The addressing of a sine-cosine table 35 is accomplished by stepping a memory address counter 36 every N/4P during a pass. The counter bit weights are used in reverse order (i.e., the least significant bit (LSB) of the counter is used to address the most significant bit (MSB) of the memory, etc.).

The two above paragraphs establish the control mechanics for any value of N where $N = 2^{\gamma}$, and $\gamma$ is an integer. Since all values of one pass are available prior to the start of the following pass, array scaling or "normalization" of the entire data block is used to reduce the number of bits required in the shift registers and the arithmetic unit.

Figure 4:
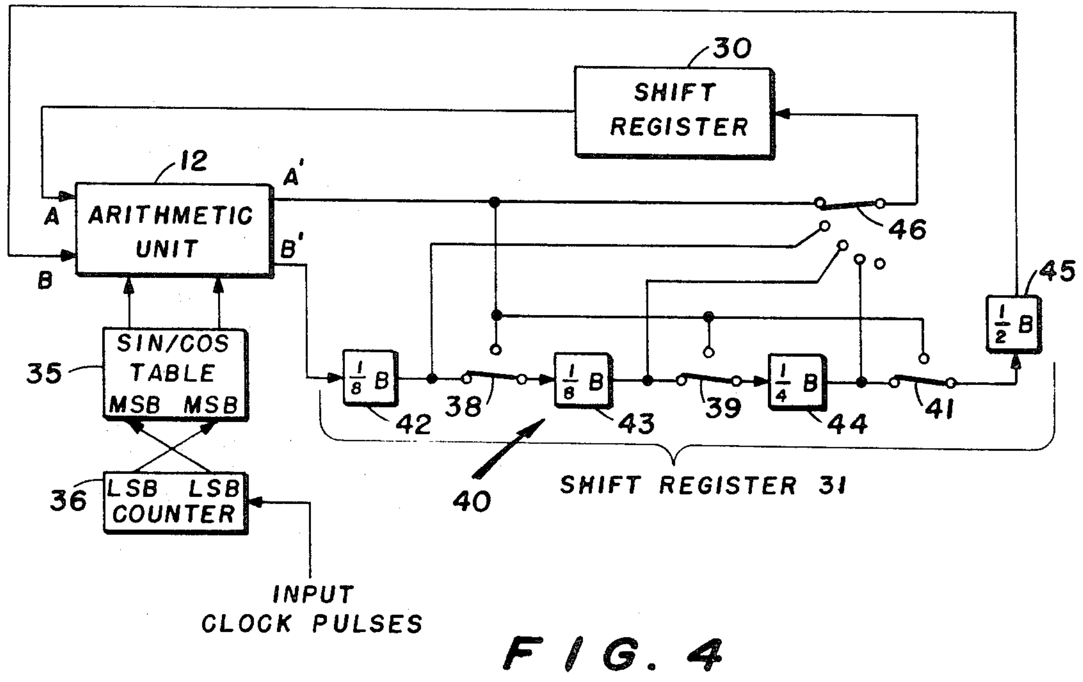
FIG. 4 is a block diagram of the Digital Fourier Analyzer reiterative fast Fourier transform unit utilizing variable delay.

For a small number of points per data set, digitally controlled variable delay units (30, 34 and 31, 32 of FIG. 3) offer the most economical implementations. Referring now to FIG. 4, for systems requiring large values of N (i.e., $N > 64$), the register 31 of FIG. 3 can be replaced by a variable delay 40. However, additional switching is required and provided by switches 38, 39, 41 and 46. Switch 46 operates in conjunction with switches 38, 39 and 41 such that when the first switching occurs the A′ output is connected through delay unit 45 to the B input of the arithmetic unit 12 by actuating switch 41, and switch 46 actuates to connect the B′ output with shift register 30 through delay units 42, 43 and 44. When the next switching occurs switch 46 moves back to its original position connecting the A′ output to the shift register 30 and the B′ output is again connected through delay units 42, 43, 44 and 45 to the B input of the arithmetic unit 12. Upon the next switching occurrence output A′ is connected through delay units 44 and 45 to input B and output B′ is connected through delay units 42 and 43 to shift register 30. When the switches are next actuated all switches move to their original position (as shown) connecting output A′ to shift register 30 and output B′ through delay units 42, 43, 44 and 45 to input B. This switching sequence continues for the number of passes required to process the number of data samples N. Again, switching occurs every N/4P, and shifting is continuous. The processing is performed in partial sequences by shift registers 42, 43, 44 and 45 and the processing time reduces to $0.5\ Nt_c \log_2 N$ where $t_c$ is the clock time. For systems where load and unload can be performed at the compute cycle clock rate, the shift registers can be replaced by delay lines in order to lower system cost.

The above two formats are combined in the shift register unit 14 of the FFT unit (b) used in the analyzer (FIG. 1). For shifting operations requiring delays of 1 to 64 bits, the variable shift register implementation of FIG. 3 is used to save switching circuitry. For the larger delays, the switching circuits as shown in FIG. 4 are used, which results in a savings of 448 delay stages when used in the 4,096-point system and an increase in processing rate at the expense of additional data switching. The DFA processing time for $N > 64$ equals $[128 + (N/2) \log_2 N]t_c$.

Figure 5:
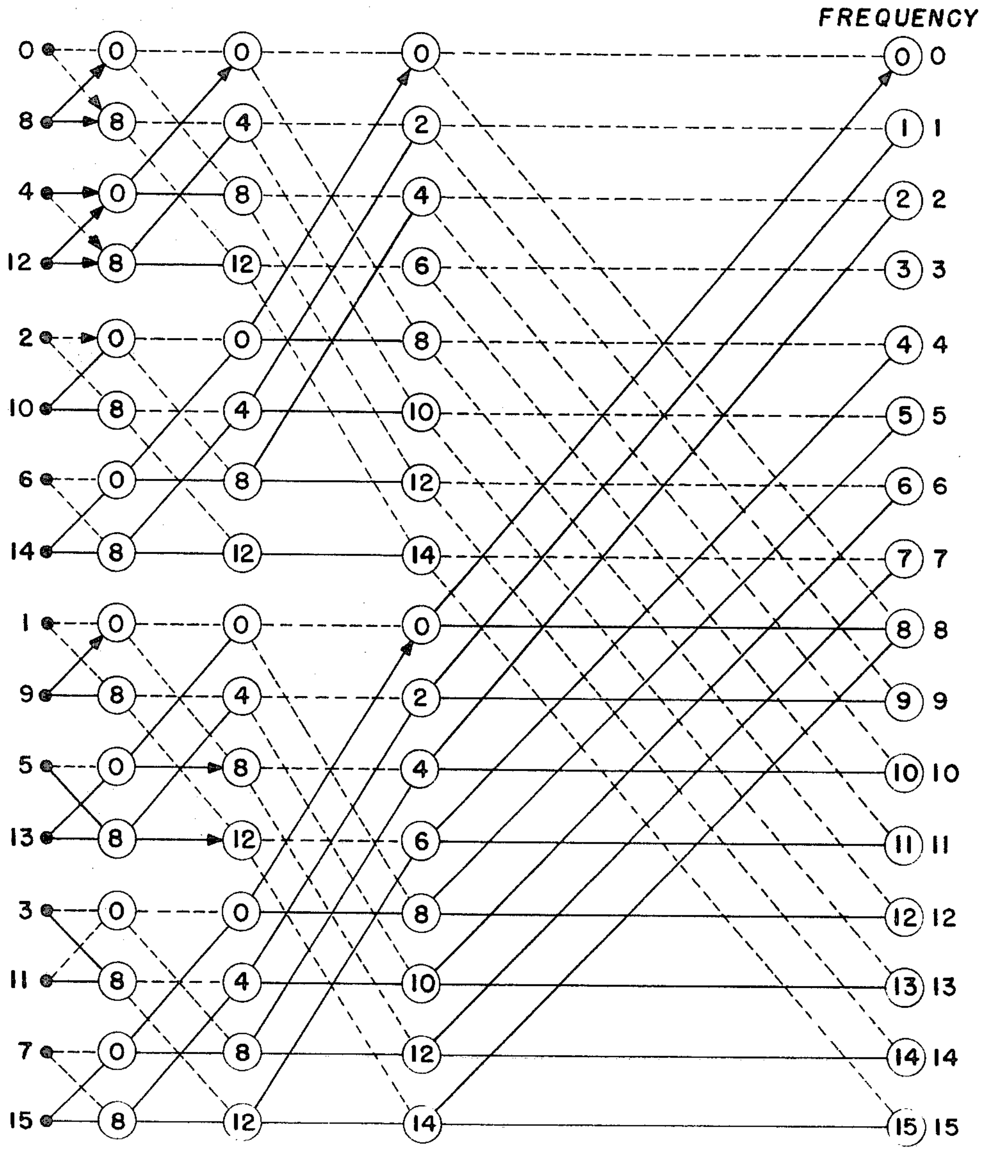
FIG. 5 is a flow graph showing a rearrangement to obtain ordered outputs.

The DFA of the present invention takes in data in naturally ordered sequence. Due to the nature of the algorithm, frequency outputs will be disordered. As previously discussed, this can be corrected by examining the sine-cosine counter and using bit wieghts reversed end-for-end for the frequency identification. However, for smoothing operations in the frequency domain and to ease oscilloscope display problems, it is desirable to have frequency bin units in order. The flow graph shown in FIG. 5 establishes the pattern implemented in the DFA for meeting this objective. Reordering the input data stream is readily achievable, since a random access memory is used in the system.

The post-processing unit which primarily comprises the core memory unit 6 and the recursive filters unit 20, both of FIG. 1, represents a blend of speed, performance and component minimization. The circuit can be used for the power averaging of ensemble sets, or for recursive filtering.

The basic steps performed in the post-processing unit (c) of FIG. 1 are to:

1. sum the output products obtained from the FFT arithmetic unit 12 of FIG. 1;
2. convert the sum word into floating point format;
3. interrogate the core memory unit 6 of FIG. 1 for previous filter value;
4. update previous filter value by multiplying by a K factor and adding the product to the new value obtained in step 2, and to
5. store updated value into the core memory unit 6.

The above steps are repeated for all frequency bins (8,192 maximum) and are confined to one clock period per frequency bin update, to be compatible with the memory read-modify-write cycle.

When analyzing a signal containing wideband noise, the short term spectra are statistically random and, when detected (as in the FFT output power spectra) exhibit a Rayleigh distribution. These short term statistical fluctuations of the spectra tend to mask the long term, relatively stationary lines desired. Averaging (or summing) of a number of ensembles improves the quality of the estimate in direct proportion to the square root of the number of statistically independent spectra averaged. Since the processor is programmed to take in essentially contiguous time data sets, the noise spectra samples for the data blocks processed are independent.

In off-line processing, a straight summation of a number of time adjacent data sets is all that is required. However, for a real time processor, it is desirable to display a running or sliding window. This can take the form of $$P(iT) = \sum_{h=0}^{H-1} p(iT - hT),$$

where $T$ = time between ensemble sets and $p(i)$ represents a point from the frequency ensemble at time $i$. To implement this directly would require a storage of the latest M values for each filter bin. To minimize the storage memory to one word per frequency bin, an inverse time exponential weighting is used. This can be expressed in non-recursive form as $$P(iT)=\sum_{h=0}^{\infty} K^h p(iT-hT),$$

Where the filter coefficient ($K$) is always less than one.

Expressed as a first order linear difference equation, the equation as implemented becomes $$P(iT) = p(i) + (1 - 1/2^k) P(i-1),$$

where $K$ is limited to values formed by $k = 0, 1, 2 \ldots 7$.

Except for the discrete nature of the above difference equation, it is similar to a resistor-capacitor low-pass filter with a gain of $2^k$. If a single one in a field of zeroes is used as an input, the transfer function is obtained and can be completely described by the filter decay rates. For $k$ values of 3 or more, the effective time constant of the circuit is equal to $2^k$T. T can be controlled independently of the data gathering time. However, in normal usage, $T = N/f_s$ + compute time.

The input to the post-processing unit is two 24-bit words (the square of the real and imaginary parts of the Fourier coefficients and referred to as the $I^2$ and $Q^2$ components) plus 5 bits of block floating point. The block floating point number represents an exponent common to the entire array of coefficients. This represents a dynamic range equivalent to 27 bits ($\approx$ 81 dB) for a 4,096 point transform with an 8-bit input word. An additional 7 bits of range is required for implementation of the $k = 7$ mode of the recursive filter for a maximum possible dynamic range of 100 dB.

For useful outputs, the above dynamic range should be preserved. However, from an engineering viewpoint, accuracy of representation seldom requires magnitudes to be expressed to greater than $\pm$0.15 dB. Limiting the accuracy reduces the floating point conversion hardware. Thus, the raw power spectra can be represented by a 6-bit exponent (characteristic) plus 5 accuracy bits (mantissa). However, a minimum of 7 more bits is required in the mantissa of the filtered output [P ($i$)] since there is an integration gain of $2^7$ for $k = 7$. The core memory used for the storing of the P($i$) values has avaiable 20 bits total, and all were used, allowing 6 bits for characteristic and 14 bits for the mantissa.

Figure 6:
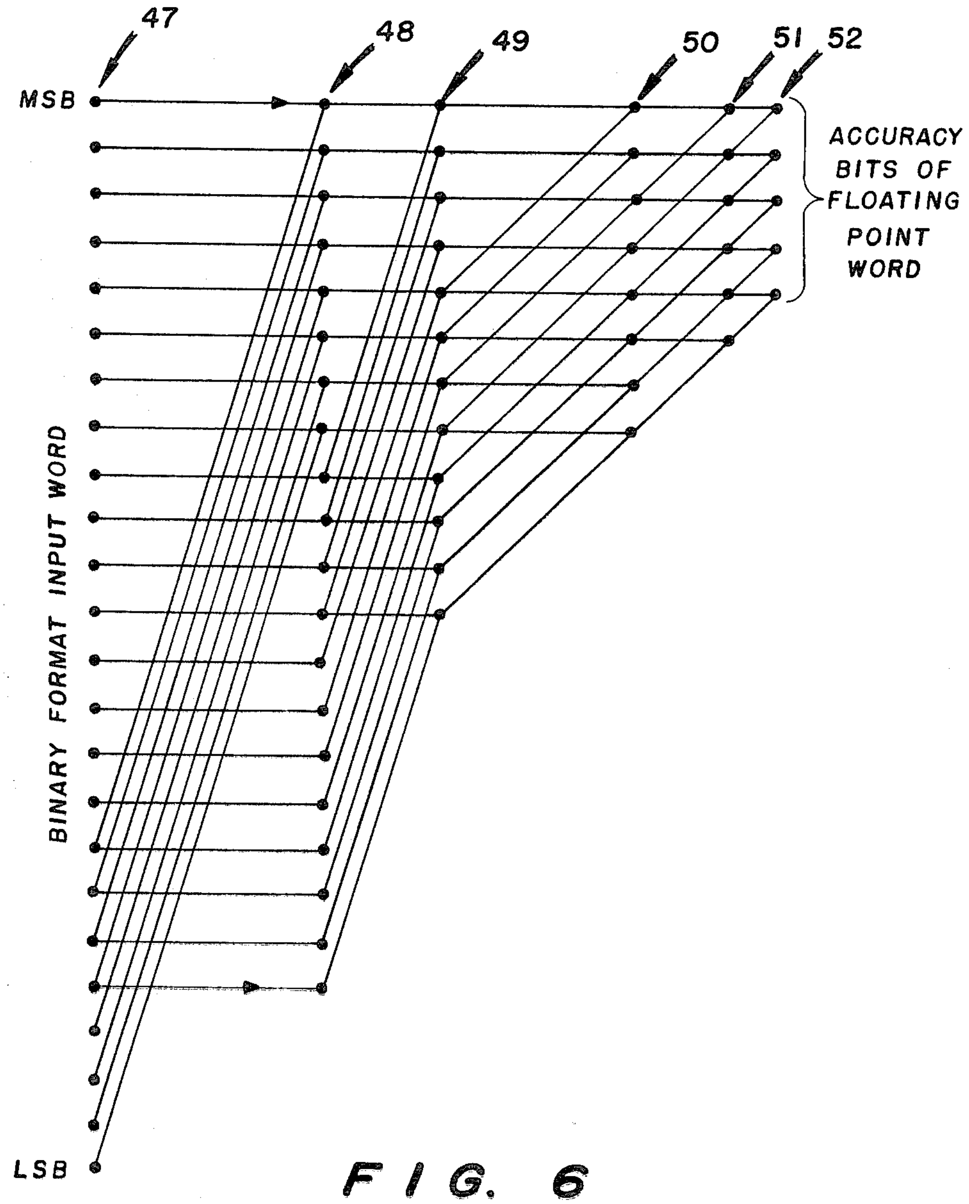
FIG. 6 is a flow graph showing a minimal switching tree for binary to floating point operation.

The principle of the floating point operation used is illustrated in FIG. 6. After adding the $I^2$ and $Q^2$ terms, the most significant 16 bits are examined for zero. The input bits are shown as black circles in column 46. The bits are presented in binary format with the most significant bit (MSB) appearing at the top of the order. The least significant bit (LSB) is presented at the bottom. If the bits are zero, the lower order bits are logic shifted 16 bits. If not, the bits transfer to the next level of logic shown in column 47 without shifting. This process is repeated for 8, 4, 2 and 1 bits each time making a decision to logic shift or not. The number of shifts determine the characteristic, and the output is a number between $(1.00 \text{ and } 1.74)_8$. The block floating point number from the FFT unit is added to the characteristic prior to sending the reformatted number to the filter cards. Since no clocking is used, it requires 0.15 $\mu$s for ripple delays. Speed is not important, since the core memory read-modify-write cycle time predominates.

Figure 7:
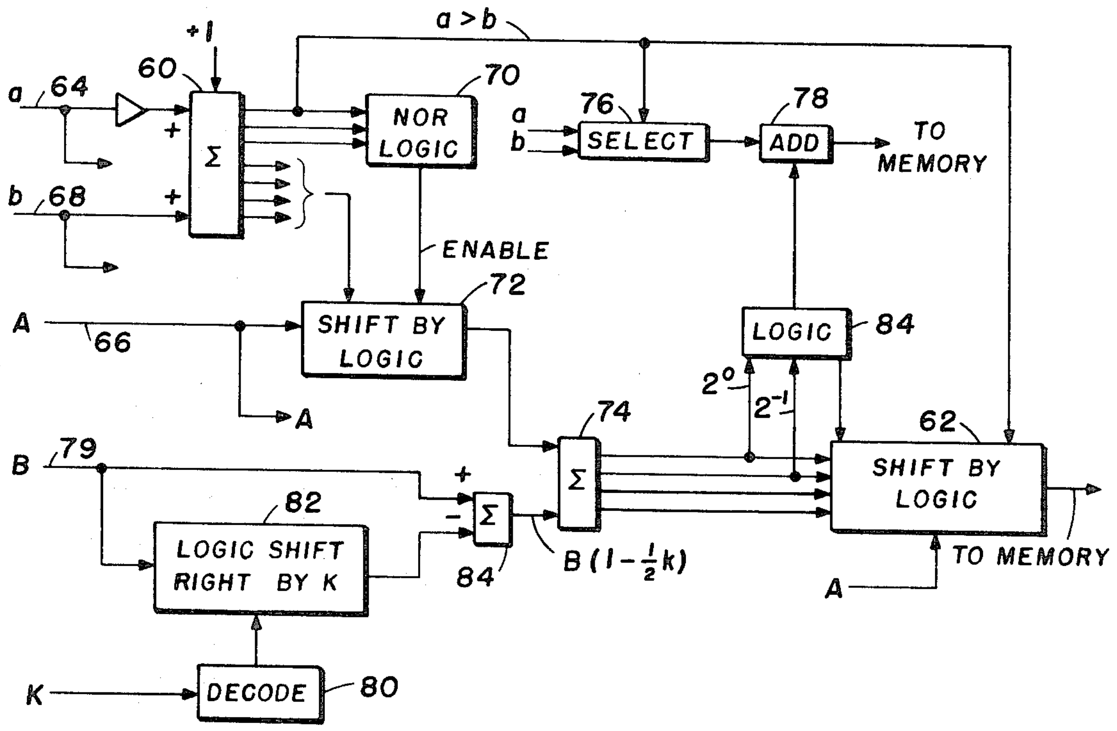
FIG. 7 is a block diagram for the floating point post-detection processing unit.

FIG. 7 is a block diagram of the apparatus used to add two floating point numbers. The numbers are in the form of $A' = A2^a$ where "$a$" indicates point position and "$A$" indicates accuracy. Steps for adding two numbers (A' and B') are as follows:

1. Find $|a - b|$.
2. Logic shift right the accuracy bits of the smallest of the two numbers by $|a - b|$ so that the bit weights of the accuracy words match.
3. Add the shifted accuracy bit to the larger number. If the sum is 2 or greater, it is logic shifted right by one bit and one is added to the larger characteristic. If not, the larger of the two characteristics is used directly for the point position indicator of the sum.

Assuming $A' = p(n)$ and $B' = K\,P(n-1)$, the following hardware reducing restrictions are used in implementing the recursive filter:

1. If $a \geq 2b$, A' is used as the output.
2. If $b \geq 13a$, B' is used as the output.

The first restriction affects initial buildup when A' is noise-like. For steady state conditions, the average value of A' is approximately $2^k$ times smaller than B'. For Rayleight distribution inputs, the probability of A' > B' for $k = 2$ is less than 0.001 percent. (This value decreases rapidly for higher values of $k$). The second restriction affects B' when it is 36 dB larger than A'. By limiting integration gains to 21 dB, the probability of a low input not being counted is less than 0.2 percent for worst case ($k = 7$) with Rayleigh type inputs.

FIG. 7 shows the block diagram for the recursive filter implemented. A full adder 60 determines the difference of exponents. If $a > b$, then $a$ and A input words shown at 64 and 66 are switched to the outputs via logic shift circuit 62. If $13 \geq (b-a) \geq 0$, the $b$ input bits shown at 68, are selected for output via a NOR logic circuit 70, a shift by logic circuit 72, and an adder circuit 74. More specifically, the bits are right shifted by shift by logic circuit 72 and applied to summing circuit 74. The output of the summing circuit 74 is applied to the logic shift circuit 62 which shifts by $(b - a)$ bits. If $(b - a) > 13$, the $b$ bits are selected for output by a select circuit 76 and an adder circuit 78.

The B inputs 79 meanwhile are logic shifted right by $k$ via a decode circuit 80 and logic shift circuit 82, inverted, and added in an adder 84 with the B input to form the multiplication by K. As a result of this action, the mantissa formed may be in improper form since the value may fall below 1.0. However, there is no need to reformat at this point. After adding it to the shifted A bits in adder 74 the output of adder 74 is examined in logic circuit 84 to ascertain if the sum is between the value of 1 and 2. If too large, a logic right shift is performed in logic shift circuit 62 on the mantissa and a one is added to the characteristic. Correspondingly, a one is subtracted if the value of the mantissa falls below one.

I claim:

1. In a digital spectral analyzer containing a fast Fourier transform unit utilizing the Cooley-Tukey algorithm for computing the Fourier transform coefficients from a number N of digitized samples of an input signal and including an arithmetic unit controlled by a clock actuated trigonometric function generator, said arithmetic unit receiving at first and second input terminals respectively a pair of signals A and B each comprising N/2 digitized values and on reiterative passes P performing rotation Z in rectangular co-ordinates and complex addition on said pair of signals to produce first and second output signals $A' = A + B \exp(-J2\pi Z/N)$ and $B' = A - B \exp(-j2\pi Z/N)$ the improvement comprising:

first and second shift register means having input and output terminals and having lengths which vary according to the relationship N/4P, said first register means input terminal connected to receive the second output signal B' of said arithmetric unit, said second register means output terminal connected to the first input of said arithmetic unit, third shift register means of fixed length equal to N/2having an input and output terminal said output terminal connected to the second input of said arithmetic unit, and switching means alternately operable between a first and second condition at a rate according to the relationship N/4P, having a first input terminal connected to receive the first output signal A' of said arithmetic unit, having a second input terminal connected to said first shift register means output terminal and having a first output terminal connected to said second shift register means input terminal, having a second output terminal connected to said third shift register means input terminal, said switching means being such that in said first condition said first and second input terminals are connected respectively to said first and second output terminals and in said alternate second condition said first input terminal is connected to said second output terminal and said second input terminal is connected to said first output terminal, said shift registers having lengths such that in said first switch condition the length of said second shift register means equals the combined lengths of said first and third shift register means, whereby said digitized values are staggered in time and are placed in order for a next reiterative pass through said arithmetic unit.

2. In a digital spectral analyzer containing a fast Fourier transform unit utilizing the Cooley-Tukey algorithm for computing the Fourier transform coefficients from a number N of digitized samples of an input signal and including an arithmetic unit controlled by a clock actuated trigonometric function generator, said arithmetic unit receiving at first and second input terminals respectively a pair of signals A and B each comprising N/2 digitized values and on reiterative passes P performing rotation Z in rectangular coordinates and complex addition on said pair of sigals to produce first and second output signals $A' = A + B \exp(-j2\pi Z/N)$ and $B' = A - B \exp(-j2\pi Z/N)$ the improvement comprising:

first shift register means having input and output terminals and having a length given by the relationship N/2, said output terminal being connected to the first input terminal of said arithmetic unit, second and third shift register means each having input and output terminals and each having a length equal to one-eighth the length of said first register means, the input terminal of said second register means being connected to receive the second output signal B' of said arithmetic unit, fourth shift register means having input and output terminals and having a length equal to one-fourth the length of said first register means, fifth shift register means having input and output terminals and having a length equal to one-half the length of said first register means, the output terminal of said fifth register means being connected to the second input terminal of said arithmetic unit, and switching means having first, second, third and fourth input terminals and first, second, third and fourth output terminals and being operable among first, second, third and fourth switch conditions at a rate N/4P and in the condition sequence: first, second, first, third, first, fourth, first, the first, second, third and fourth input terminals of said switching means being connected respectively to the first output terminal of said arithmetic unit, the output terminal of said fourth register means, the output terminal of said third register means, and the output terminal of said second register means, the first, second, third and fourth output terminals of said switching means being connected respectively to the input terminal of said first register means, the input terminal of said fifth register means, the input terminal of said fourth register means, and the input terminal of said third register means, in said first switch condition said first, second, third and fourth switch input terminals being connected respectively to said first, second, third and fourth switch output terminals, in said second switch condition said first and second switch input terminals being connected respectively to said second and first switch output terminals and said third and fourth switch input terminals being connected respectively to said third and fourth switch output terminals, in said third switch condition said first and third switch input terminals being connected respectively to said third and first switch output terminals and said second and fourth switch input terminals being connected respectively to said second and fourth switch output terminals, in said fourth switch condition said first and fourth switch input terminals being connected respectively to said fourth and first switch output terminals and said second and third switch input terminals being connected respectively to said second and third switch output terminals.

* * * * *